US010020794B2

(12) United States Patent
Oosumi et al.

(10) Patent No.: US 10,020,794 B2
(45) Date of Patent: Jul. 10, 2018

(54) WIRELESS POWER TRANSMITTER APPARATUS HAVING POWER TRANSMITTER APPARATUS AND POWER RECEPTION APPARATUS SUPPLIED WITH ELECTRIC POWER ENERGY VIA SPACE

(71) Applicant: Panasonic Intellectual Property Management Co., Ltd., Osaka (JP)

(72) Inventors: Hideo Oosumi, Osaka (JP); Hiroshi Kanno, Osaka (JP); Tsutomu Sakata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 259 days.

(21) Appl. No.: 14/784,395

(22) PCT Filed: Apr. 9, 2014

(86) PCT No.: PCT/JP2014/002050
§ 371 (c)(1),
(2) Date: Oct. 14, 2015

(87) PCT Pub. No.: WO2014/174783
PCT Pub. Date: Oct. 30, 2014

(65) Prior Publication Data
US 2016/0079951 A1    Mar. 17, 2016

(30) Foreign Application Priority Data

Apr. 23, 2013    (JP) ................................ 2013-090258

(51) Int. Cl.
*H01F 27/42*    (2006.01)
*H01F 37/00*    (2006.01)
(Continued)

(52) U.S. Cl.
CPC ............... *H03H 7/38* (2013.01); *H01F 38/14* (2013.01); *H02J 5/005* (2013.01); *H02J 50/12* (2016.02)

(58) Field of Classification Search
CPC ........ H04B 5/0037; H02J 5/005; H02J 50/12; H03H 7/38
See application file for complete search history.

(56) References Cited

U.S. PATENT DOCUMENTS

2008/0079392 A1* 4/2008 Baarman ................. H02J 7/025
320/108
2009/0134713 A1* 5/2009 Stevens ................... H02J 5/005
307/104
(Continued)

FOREIGN PATENT DOCUMENTS

JP       2009-118587        5/2009
JP   WO 2012086051 A1 *  6/2012   .............. H02J 5/005
(Continued)

OTHER PUBLICATIONS

English translation of Search Report issued Mar. 15, 2017 in corresponding Chinese Application No. 201480021151.3.
(Continued)

*Primary Examiner* — Rexford Barnie
*Assistant Examiner* — Rasem Mourad
(74) *Attorney, Agent, or Firm* — Wenderoth, Lind & Ponack, L.L.P.

(57) ABSTRACT

A power transmitter apparatus of a wireless power transmitter apparatus transmits electric power from the power transmitter apparatus to a power reception apparatus by electromagnetically coupling a power transmitter apparatus resonance coil with a power reception apparatus resonance coil. The power transmitter apparatus includes a control signal detector portion that generates a control signal based on a voltage change of a voltage across both terminals of the
(Continued)

power transmitter apparatus resonance coil and transmits the control signal; and a switching circuit that resonates the power transmitter apparatus resonance coil on the basis of the control signal.

4 Claims, 7 Drawing Sheets

(51) Int. Cl.
*H01F 38/00* (2006.01)
*H03H 7/38* (2006.01)
*H01F 38/14* (2006.01)
*H02J 5/00* (2016.01)
*H02J 50/12* (2016.01)

(56) References Cited

U.S. PATENT DOCUMENTS

| | | | | |
|---|---|---|---|---|
| 2011/0080056 A1* | 4/2011 | Low | ............ | H02J 5/005 |
| | | | | 307/104 |
| 2012/0104867 A1* | 5/2012 | Mudrick | ............ | H02J 7/025 |
| | | | | 307/104 |
| 2013/0015813 A1* | 1/2013 | Kim | ............ | H02J 7/00 |
| | | | | 320/108 |
| 2013/0119930 A1* | 5/2013 | Sakoda | ............ | B60L 11/182 |
| | | | | 320/108 |
| 2013/0257370 A1* | 10/2013 | Ichikawa | ............ | H02J 5/005 |
| | | | | 320/108 |

FOREIGN PATENT DOCUMENTS

| | | |
|---|---|---|
| JP | 2012-195993 | 10/2012 |
| JP | 2013-005699 | 1/2013 |
| WO | 2012/061246 | 5/2012 |
| WO | 2012/086051 | 6/2012 |
| WO | 2013/031589 | 3/2013 |

OTHER PUBLICATIONS

International Search Report dated Jun. 24, 2014 in International (PCT) Application No. PCT/JP2014/002050.

International Preliminary Report on Patentability and Written Opinion of the International Searching Authority dated Oct. 29, 2015 in International (PCT) Application No. PCT/JP2014/002050.

* cited by examiner

WIRELESS POWER TRANSMITTER APPARATUS HAVING POWER TRANSMITTER APPARATUS AND POWER RECEPTION APPARATUS SUPPLIED WITH ELECTRIC POWER ENERGY VIA SPACE

TECHNICAL FIELD

The present disclosure relates to a power transmitter apparatus, a power reception apparatus and a wireless power transmitter apparatus, which are supplied with electric power energy via a space from the power transmitter apparatus.

BACKGROUND ART

In recent years, utilization of a wireless power transmission technology has been considered as battery charging means such as batteries of mobile phones. In such a wireless power transmitter apparatus, there is such a known technology that a resonance coil of the power transmitter apparatus is opposed to that of a power reception apparatus, thereby electric power is transmitted. As this kind of wireless power transmitter apparatus, it is known by, for example, Patent Literature 1.

According to Patent Literature 1, the power reception apparatus performs a matching adjustment to achieve impedance matching of a receiving antenna with a rectification portion for the matching portion of the power reception apparatus in such a state that the transmission power is lower than a defined power value W1$a$, and thereafter, the power reception apparatus receives the transmission power of the defined power value W1$a$. The power reception apparatus has an adjustment load, which is connected to a prescribed position on the subsequent stage side of the matching portion of the power reception apparatus in place of the battery at the time of matching adjustment to make the impedance when the battery side is viewed from the prescribed position coincide with the impedance when the battery side is viewed from the prescribed position while the rectification portion is supplying a direct-current voltage Vo to the battery in the power receiving state of the reception power of the defined power value W1$a$, and therefore, it is possible to prevent from decreasing the transmission efficiency.

CITATION LIST

Patent Literature

PATENT LITERATURE 1: Japanese Patent Laid-open Publication No. JP2012-195993A

SUMMARY OF THE INVENTION

Technical Problem

However, in the aforementioned conventional wireless power transmitter apparatus, adjustment loads of different impedances need to be prepared when used for batteries having different impedances, and therefore, there has been a problem of a cost increase. In addition, there has been such a problem that, when fluctuations occur in the electric power or voltage of the power transmitter apparatus, a transient phenomenon such as the output voltage given to the battery comes to have an abnormal value occurs, and therefore, the battery is damaged.

Further, a change in the output voltage of the power reception apparatus becomes large in the case that the impedance fluctuations of the battery are large. Therefore, in the case that the impedance of the battery at the time of starting power transmission is unknown, the change in the output voltage when the apparatus is connected to the battery becomes large, and therefore, there has been such a problem that the battery is not supplied with electric power at a stabilized voltage.

An object of the present invention is to solve the aforementioned problems and provide a power transmitter apparatus, a power reception apparatus and a wireless power transmitter apparatus capable of preventing an abnormal voltage and the like due to a transient phenomenon from being given to the load and supplying a stable voltage to the load.

Solution to Problem

According to a power transmitter apparatus of a first disclosure, the power transmitter apparatus is a power transmitter apparatus of a wireless power transmitter apparatus for transmitting electric power from the power transmitter apparatus to a power reception apparatus by electromagnetically coupling a power transmitter apparatus resonance coil with a power reception apparatus resonance coil. The power transmitter apparatus includes a control signal detector portion that generates a control signal based on a voltage change of a voltage across both terminals of the power transmitter apparatus resonance coil and transmits the signal; and a switching circuit that resonates the power transmitter apparatus resonance coil on the basis of the control signal.

In addition, according to a power reception apparatus of a second disclosure, the power reception apparatus is a power reception apparatus of a wireless power transmitter apparatus for transmitting electric power from a power transmitter apparatus to the power reception apparatus by electromagnetically coupling a power transmitter apparatus resonance coil with a power reception apparatus resonance coil. The power reception apparatus includes a rectifier circuit that converts a defined alternating-current voltage received from the power reception apparatus resonance coil into a defined direct-current voltage and outputs a resulting voltage, first switching means for connecting the rectifier circuit with a real load when the defined direct-current voltage is included within a defined voltage range, and switching means for connecting the rectifier circuit with the real load when the defined direct-current voltage is included within a defined voltage range and interrupting the connection between the rectifier circuit and the real load when the defined direct-current voltage is out of the defined voltage range.

Advantageous Effects of the Invention

According to the power transmitter apparatus, the power reception apparatus and the wireless power transmitter apparatus of the present disclosure, it is possible to prevent an abnormal voltage and the like due to a transient phenomenon from being given to the load and to supply a stable voltage to the load.

DESCRIPTION OF EMBODIMENTS

Embodiments of the present disclosure will be described with reference to the drawings. It is noted that like components are denoted by like reference numerals, and no description is provided for them in each of the following embodiments. Furthermore, the present disclosure is limited to none of the following embodiments.

First Embodiment

Figure 1:
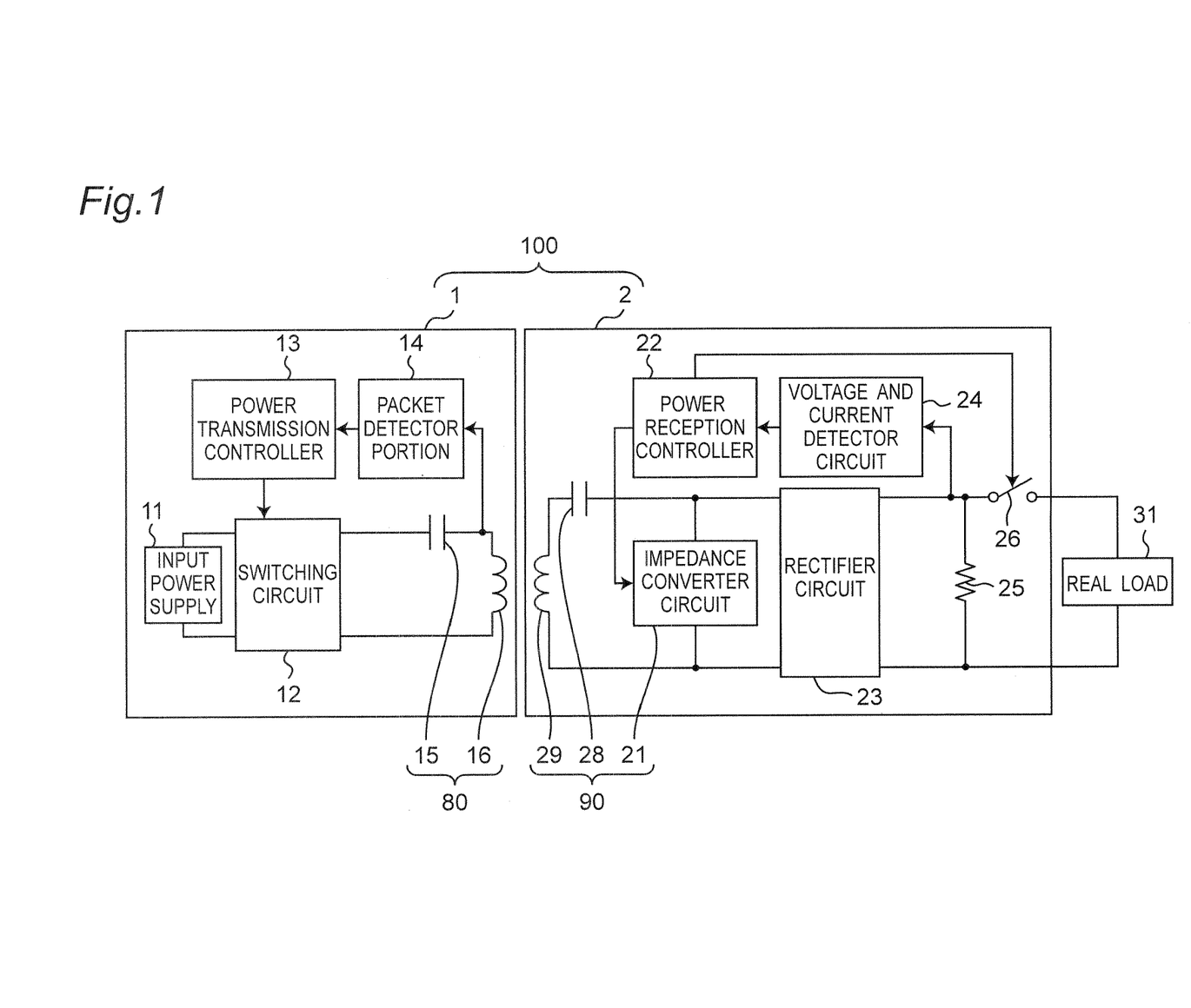
FIG. 1 is a block diagram showing components of a wireless power transmitter apparatus 100 and its peripheral components, according to a first embodiment of the present disclosure.

FIG. 1 is a block diagram showing components of a wireless power transmitter apparatus 100 and its peripheral components, according to a first embodiment of the present disclosure. Referring to FIG. 1, the wireless power transmitter apparatus 100 is configured to include a power transmitter apparatus 1, and a power reception apparatus 2 that supplies power to a real load 31 connected to the power reception apparatus 2. In addition, the power transmitter apparatus 1 is configured to include an input power supply 11 configured by, for example, an AC/DC converter or the like, a switching circuit 12 configured by, for example, an FET (field-effect transistor) or the like, a power transmission controller 13, a packet signal detector portion 14 configured by, for example, a peak hold circuit including a discharge circuit and a comparator circuit, and a resonance circuit 80. In addition, the resonance circuit 80 is configured to include a power transmitter apparatus resonance capacitor 15 and a power transmitter apparatus resonance coil 16.

Referring to FIG. 1, the power reception apparatus 2 is configured to include a resonance circuit 90, a power reception controller 22, and a rectifier circuit 23 that is configured by, for example, a diode and a capacitor and rectifies and smoothes the power received from a power reception apparatus resonance coil 29, a voltage adjustment load 25 such as a resistor that is connected to the subsequent stage of the rectifier circuit 23 and adjusts the voltage value of the direct-current voltage outputted from the rectifier circuit, a voltage and current detector circuit 24, and a real load connector switch 26 that connects the power reception apparatus 2 with the real load 31. In addition, the resonance circuit 90 is configured to include an impedance converter circuit 21, a power reception apparatus resonance coil 29, and a power reception apparatus resonance capacitor 28 connected in series with the power reception apparatus resonance coil 29. In this case, power is transmitted in such a method that the power transmitter apparatus 1 does not contact with the power reception apparatus 2 by electromagnetic induction from the power transmitter apparatus 1 to the power reception apparatus 2, thereby supplying power to the real load 31 connected to the power reception apparatus 2. According to the power transmitter apparatus 1 of the present disclosure, it is possible to not only supply power to the equipment of the real load 31 connected to the power reception apparatus 2 at a preset voltage but also supply power to the equipment connected to the power reception apparatus 2 after completion of transient phenomena unique to the wireless power transmission such as transient phenomena due to fluctuations at the startup time or in the input voltage and the like. Therefore, it is possible to further improve the safety of the equipment.

Figure 2:
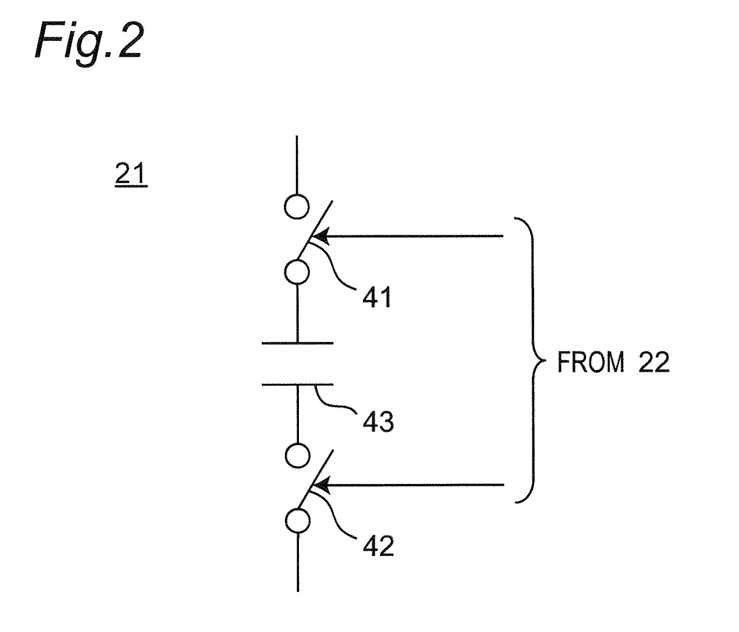
FIG. 2 is a block diagram showing concrete components of an impedance converter circuit 21 of FIG. 1.

FIG. 2 is a block diagram showing concrete components of the impedance converter circuit 21 of FIG. 1. The impedance converter circuit 21 is configured to include switches 41 and 42 and a capacitor 43.

In the power transmitter apparatus 1 of FIG. 1, the input power supply 11 converts an alternating-current voltage such as 100 V into a direct-current voltage V1 of an arbitrary voltage, and outputs the direct-current voltage V1 to the switching circuit 12. In addition, the power transmission controller 13 generates a switching timing signal S1 having a certain frequency component, and outputs the signal to the switching circuit 12. Further, the switching circuit 12 converts the inputted direct-current voltage V1 into an alternating-current voltage V2 by performing switchover of turning on/off at the duty ratio of the switching timing signal S1 on the basis of the switching timing signal S1 inputted from the power transmission controller 13, and outputs the alternating-current voltage V2 to the power transmitter apparatus resonance capacitor 15 and the power transmitter apparatus resonance coil 16. It is noted that the frequency and a duty ratio of the switching timing signal S1 can be arbitrarily changed by the power transmission controller 13.

The power transmitter apparatus resonance coil 16 is placed oppositely to the power reception apparatus resonance coil 29 and electromagnetically coupled to the power reception apparatus resonance coil 29 of the power reception apparatus 2 to transmit an alternating-current voltage V3 to the power reception apparatus resonance coil 29 by electromagnetic induction. In addition, the rectifier circuit 23 converts the voltage value of the alternating-current voltage V3 into a direct-current voltage V4, and supplies the converted direct-current voltage V4 to the voltage adjustment load 25 and the real load 31. It is also possible to replace the rectifier circuit 23 with, for example, an AC/DC converter.

The voltage and current detector circuit 24 receives an input of the direct-current voltage V4 from the rectifier circuit 23, detects the voltage value V41 and the current value I41 of the voltage and current direct-current voltage V4, and transmits the voltage value V41 and the current value I41 to the power reception controller 22.

The power reception controller 22 turns on the real load connector switch 26 and simultaneously turns off the switch 41 and the switch 42 that constitute the impedance converter circuit 21 if the voltage value V41 is within a permissible voltage range of the real load 31 on the basis of the voltage value V41 or the current value I41 inputted from the voltage and the current detector circuit 24. The controller turns off the real load connector switch 26 and simultaneously turns on the switch 41 and the switch 42 that constitute the impedance converter circuit 21 if the voltage value V41 is outside the permissible voltage range of the real load 31.

That is, the real load connector switch 26 is switching means for connecting the rectifier circuit 23 with the real load 31 when the defined direct-current voltage is included within the defined voltage range or interrupting the connection between the rectifier circuit 23 and real load 31 when the defined direct-current voltage is outside the defined voltage range.

The impedance converter circuit 21 changes the impedance of the resonance circuit 90. In detail, in FIG. 2, the impedance of the resonance circuit 90 is changed by connecting the capacitor 43 with the power reception apparatus resonance capacitor 28 and the power reception apparatus resonance coil 29 by simultaneously turning on the switch 41 and the switch 42. That is, the voltage across both terminals of the power transmitter apparatus resonance coil 16 is changed by serially connecting the capacitor 43 that constitutes the impedance converter circuit 21 with the power reception apparatus resonance coil 29 and the power reception apparatus resonance capacitor 28, and generates a packet signal P1 on the basis of this change. That is, voltage fluctuations of the power transmitter apparatus resonance coil 16 are repeated by repeating the turning on/off of the switches 41 and 42 of the impedance converter circuit 21, and the fluctuations are transmitted as the packet signal P1 to the power transmitter apparatus 1. It is noted that the circuit shown in FIG. 2 is one example of the impedance converter circuit 21, and can be otherwise constituted of a variety of circuits that use, for example, a resistor, a coil or the like.

The packet signal detector portion 14 demodulates the packet signal P1 by detecting the change of the voltage across both terminals of the power transmitter apparatus resonance coil 16 accompanying the change of a voltage across both terminals of the power transmitter apparatus resonance coil 16 that is electromagnetically coupled to the power reception apparatus resonance coil 29, and transmits the packet signal P1 to the power transmission controller 13. That is, the packet signal detector portion 14 is a control signal detector portion that generates a control signal on the basis of the voltage change of the voltage across both terminals of the power transmitter apparatus resonance coil and transmits the signal.

The power transmission controller 13 receives the packet signal P1 from the packet signal detector portion 14, obtains the voltage value V41 generated at the voltage adjustment load 25 on the basis of the packet signal P1, generates the switching signal S1 to control the switching circuit 12 from the voltage value V41, and outputs the switching signal S1 to the switching circuit 12. That is, the power transmission controller 13 receives the control signal from the packet signal detector portion 14, and generates the switching timing signal S1 having a defined frequency component to control the switching frequency of the switching circuit 12. In this case, the power transmission controller 13 has a table configured by, for example, the direct-current voltage V4 of the power reception apparatus 2 and the switching frequency of the switching circuit 12. The switching frequency is changed so that the voltage value V41 obtained from the packet signal P1 is included within the permissible voltage range of the real load 31 on the basis of the table, and the switching operation of the switching circuit 12 is controlled on the basis of the changed switching frequency.

Next, the operation of the wireless power transmitter apparatus 100 according to the first embodiment of the present disclosure is described with reference to FIG. 3.

Figure 3:
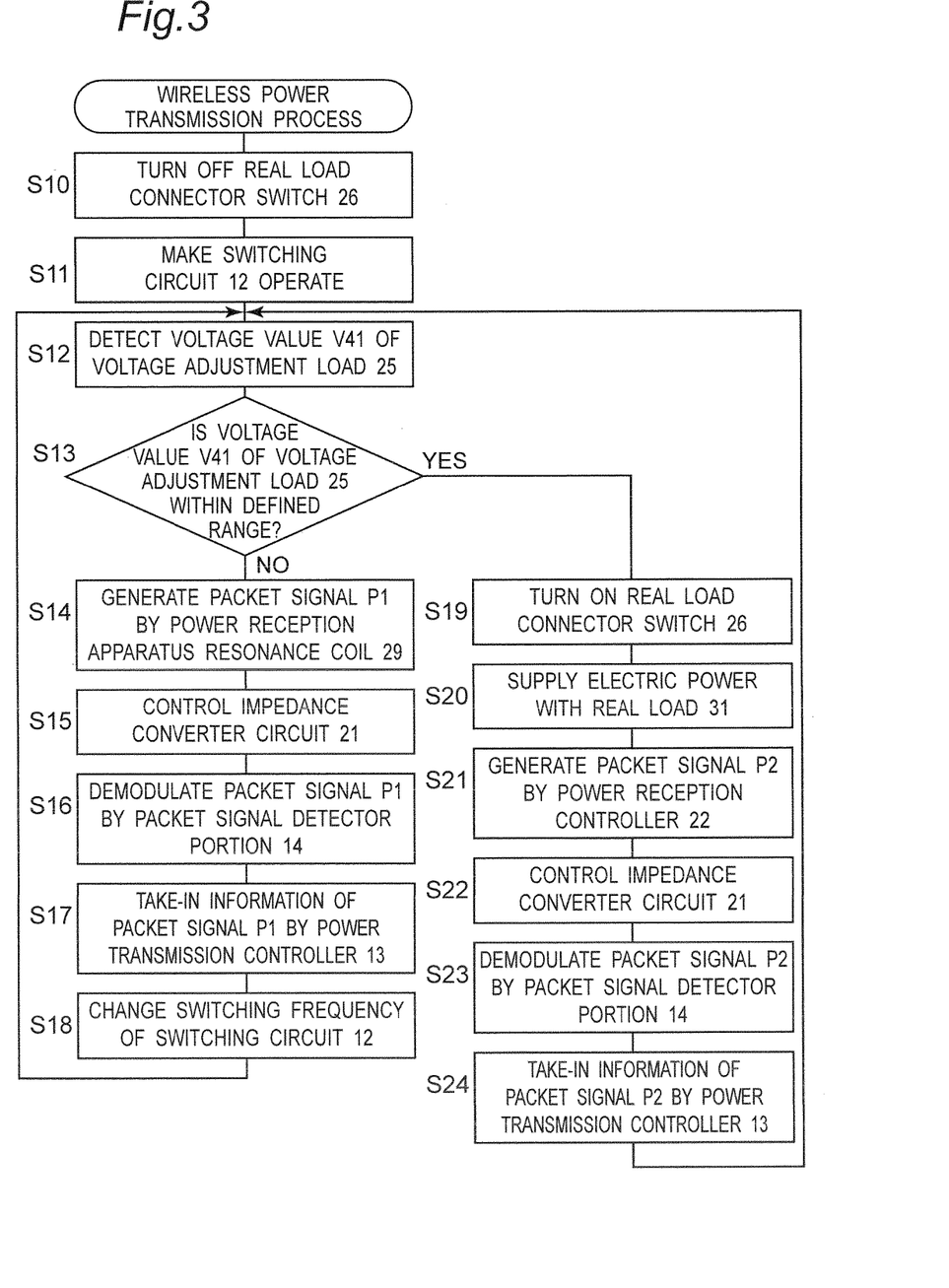
FIG. 3 is a flow chart showing wireless power transmission processing procedures of the wireless power transmitter apparatus 100 of FIG. 1.

FIG. 3 is a flow chart showing wireless power transmission processing procedures of the wireless power transmitter apparatus 100 of FIG. 1. This flow chart shows a processing flow from the startup of the input power supply 11 to the supply of power to the real load 31.

In FIG. 3, first of all, the real load connector switch 26 is necessarily turned off before the startup of the power transmitter apparatus 1 (step S10). For example, a semiconductor device of FET or photocoupler or a mechanical relay can be applied as the real load connector switch 26.

Next, the switching timing signal S1 having a specified frequency is generated at the power transmission controller 13 to operate the switching circuit 12 (step S11). An alternating-current voltage V2 is generated from the direct-current voltage V1 supplied from the input power supply 11 by performing switchover of turning on/off of the switching circuit 12, and the alternating-current voltage V2 is outputted to the power transmitter apparatus resonance capacitor 15 and the power transmitter apparatus resonance coil 16. The power transmitter apparatus resonance coil 16 is electromagnetically coupled to the power reception apparatus resonance coil 29 of the power reception apparatus 2, the alternating-current voltage V3 is transmitted to the power reception apparatus resonance coil 29 by electromagnetic induction, and the alternating-current voltage V3 is converted into the direct-current voltage V4 by the rectifier circuit 23. In this case, the value of the converted direct-current voltage V4 is equal to the value of the voltage generated at the voltage adjustment load 25. At this time, by changing the timing of turning on/off the switching circuit 12 by changing the frequency of the switching timing signal S1 given to the gate, the turning on/off timing is changed to adjust the values of the alternating-current voltage V3 and the direct-current voltage V4 of the power reception apparatus 2.

Next, the voltage value V41 of the direct-current voltage V4 generated at the voltage adjustment load 25 is detected by the voltage and current detector circuit 24 (step S12). The detected voltage value V41 is transmitted to the power reception controller 24. In this case, it is not necessary that the impedance of the voltage adjustment load 25 used in the present embodiment coincides with that of the real load 31. A mobile terminal and the like is assumed as the real load 31, and the impedance of the mobile terminal becomes several ohms if the power consumption of the mobile terminal is large in the case that the mobile terminal and the like is fed with electric power. Assuming that the voltage value V41 of the direct-current voltage V4 is 12 V, the impedance of the mobile terminal is 3Ω, and the impedance of the voltage adjustment load 25 is 3Ω conforming to the mobile terminal, then the power consumption of the voltage adjustment load 25 becomes 48 W. However, it is not realistic to mount a voltage adjustment load 25 that can endure the power consumption of 48 W. Therefore, in the present embodiment, the impedance of the voltage adjustment load 25 is assumed to be, for example, 300Ω. With this arrangement, the power consumption of the voltage adjustment load 25 can be made to be 0.48 W, which can easily be realized. Although it is assumed that the voltage value V41 of the direct-current voltage V4 is transmitted directly to the power reception controller 22 in the present embodiment, it can also be realized to convert the voltage value V41 into digital data or the like by, for example, an AD converter or the like provided for the voltage and current detector circuit 24, and transmit the digital data to the power reception controller 22 by another method.

Next, if the voltage value V41 of the direct-current voltage V4 is not within the defined voltage range, the real load connector switch 26 continues the off-state by the voltage and current detector circuit 24, and the packet signal P1 is generated by the power reception apparatus resonance coil 29 (NO in steps S13 and S14). Although the packet signal P1 includes information of the voltage value V41, it is possible to include information used for other controls besides it. In this case, the defined voltage range is the voltage range that the real load 31 can permit, and a voltage range of 10.8 V to 13.2 V becomes the defined voltage range when the input voltage range of the real load 31 is, for example, 12 V±10%.

Next, the power reception controller 22 makes the impedance converter circuit 21 operate on the basis of the voltage value V41 inputted from the voltage and current detector circuit 24 (step S15). Next, the packet signal P1 is demodulated in the packet signal detector portion 14 of the power transmitter apparatus 1 (step S16). The processes to the demodulation of the packet signal P1 are, for example, as follows. When the impedance converter circuit 21 of the power reception apparatus 2 operates in the power transmitter apparatus 1, for example, the alternating-current voltage V2 of the power transmitter apparatus resonance coil 16 changes. In this case, upon detecting the change of the voltage across both terminals of the power transmitter apparatus resonance coil 16, the packet signal detector portion 14 demodulates the packet signal P1, and transmits the packet signal P1 to the power transmission controller 13. In addition, the packet signal detector portion is configured by, for example, a peak hold circuit including a discharge circuit and a comparator circuit and able to detect the peak value of the alternating-current voltage V2 by holding and discharging it and to demodulate the packet signal P1 by comparing the peak value by a comparator. It is noted that the position of the packet signal detector portion 14 is not limited to the position of the power transmitter apparatus resonance coil 16 of FIG. 1, and it is only required to be located in a position where the impedance fluctuations of the power reception apparatus 2 viewed from the power transmitter apparatus resonance coil 16 of the power transmitter apparatus 1 as a consequence of the operation of the impedance converter circuit 21 of the power reception apparatus 2 can be detected. Moreover, when the packet signal P1 is demodulated on the basis of the change in the direct-current voltage and the current, the aforementioned peak hold circuit can be removed.

Next, the value of the voltage value V41 of the direct-current voltage V4 of the voltage adjustment load 31 contained in the packet signal P1 in the power transmission controller 13 of the power transmitter apparatus 1 is taken in (step S17). Next, when the voltage value V41 and the current value I41 of the direct-current voltage V4 contained in the information of the packet signal P1 are transmitted to the power transmission controller 13, the switching circuit 12 is controlled on the basis of each value (step S18). In this case, the switching timing signal S1 outputted from the power transmission controller 13 is given to the gate of the FET at the switching circuit 12. The FET is turned on when the gate capacitance of the FET is charged, or the FET is turned off when the gate capacitance of the FET is discharged. The turning on/off timing of the switching circuit 12 can be changed by changing the frequency of the switching timing signal S1 given to the gate at this time, and, for example, the alternating-current voltage V3 and the direct-current voltage V4 of the power reception apparatus 2 can be adjusted by changing the turning on/off timing.

By changing the switching frequency in step S18, the voltage value V41 of the direct-current voltage V4 generated at the voltage adjustment load 25 changes. If the voltage value V41 at this time is not within a defined voltage range, the processes from step S14 to step S18 will be repeated again.

Next, the processes when the voltage value V41 of the direct-current voltage V4 generated at the voltage adjustment load 25 is within the defined voltage range (YES in step S13) are described.

If the voltage value V41 of the direct-current voltage V4 generated at the voltage adjustment load 25 is within a defined voltage range (YES in step S13), then a control signal to turn on the real load connector switch 26 is outputted by the power reception controller 22 of the power reception apparatus 2.

If the real load connector switch 26 is turned on from off, then an output voltage VOUT is supplied to the real load 31 (step S20). At this time, since the direct-current voltage V4 is within the defined voltage range, the output voltage VOUT is supplied as a stable power source to the real load 31. Furthermore, by continuing the off-state of the real load connector switch 26 until the direct-current voltage V4 falls within the defined voltage range, the real load 31 can be prevented from receiving the influences of the transient responses due to the power fluctuations of the input power supply 11 at the startup time of the power transmitter apparatus 1 and sudden state changes at the operation start time of the switching circuit 12. In this case, the transient response characteristic of the output voltage VOUT based on the power fluctuations of the input power supply 11 was verified by simulations as follows.

Figure 5:
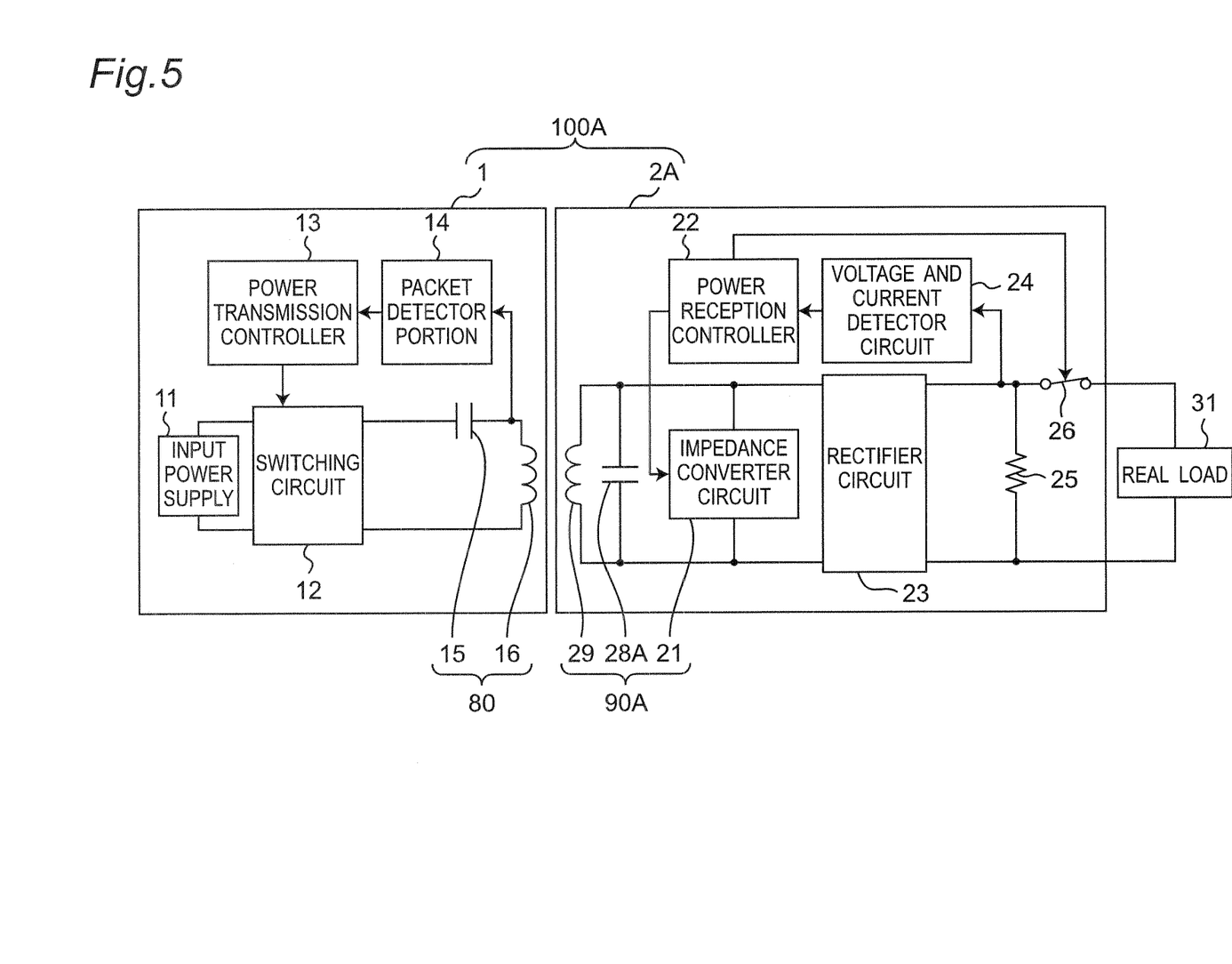
FIG. 5 is a block diagram showing components of a wireless power transmitter apparatus 100A and its peripheral components, used when verifying a transient response characteristic based on power fluctuations of an input power supply 11 by simulations.

FIG. 5 is a block diagram showing components of a wireless power transmitter apparatus 100A and its peripheral components, used when verifying transient response characteristic based on power fluctuations of an input power supply 11 by simulations. The wireless power transmitter apparatus 100A of FIG. 5 is configured to include a resonance circuit 90A in place of the resonance circuit 90 by comparison to the wireless power transmitter apparatus 100 of FIG. 1. In addition, the resonance circuit 90A is configured to include a power reception apparatus resonance capacitor 28A connected in parallel with the power reception apparatus resonance coil 29 in place of the power reception apparatus resonance capacitor 28 connected in series with the power reception apparatus resonance coil 29 by comparison to the resonance circuit 90.

Figure 6:
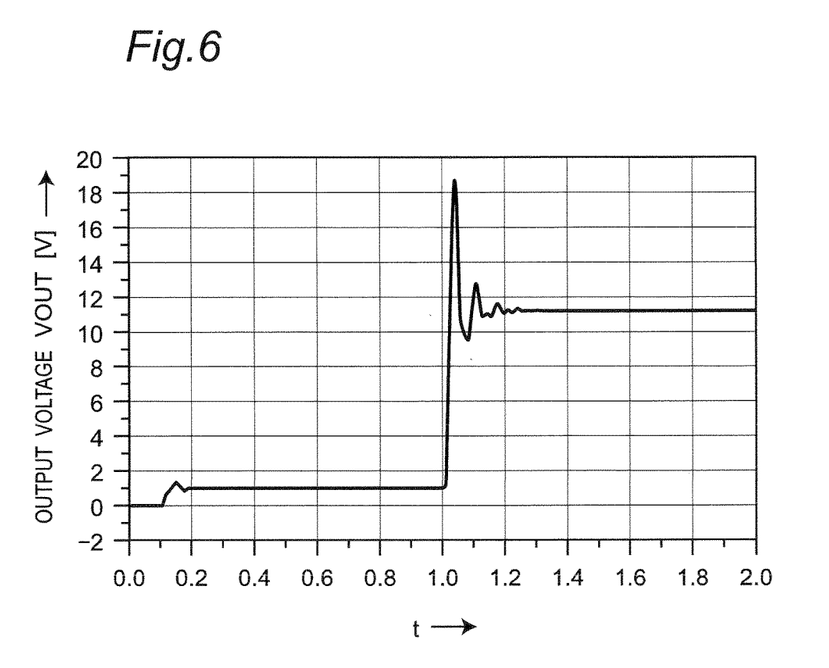
FIG. 6 is a time-base waveform chart showing a transient response characteristic of an output voltage VOUT of the wireless power transmitter apparatus 100A of FIG. 5.

FIG. 6 is a time-base waveform chart showing transient response characteristic of an output voltage VOUT of the wireless power transmitter apparatus 100A of FIG. 5. For example, the results of verifying the transient responses when the power of the input power supply 11 has suddenly changed from 1 W to 100 W by simulations are shown. The construction of the wireless power transmitter apparatus 100A used for the simulations is shown in FIG. 5, where the rectifier circuit 23 and the real load 31 are in a connected state. The power reception apparatus 2 and the real load 31 are connected together via the real load connector switch 26 of FIG. 5, and the same thing can be said for the construction not via the real load connector switch 26. The vertical axis of FIG. 6 is the output voltage VOUT of the wireless power transmitter apparatus 100A, and the horizontal axis is time t. In this case, it can be understood that the transient phenomenon of the output voltage VOUT is generated by the sudden fluctuations of the power of the input power supply 11. If the sudden fluctuations of the power source of the input power supply 11 are intentional, the risk of the transient phenomenon can be lowered by slowing down the transition of the fluctuations. However, when, for example, the power fluctuations of the input power supply 11 or the like are unintentionally generated with respect to the wireless power transmitter apparatus 100A, it becomes difficult to prevent the generation of the transient phenomenon in a manner similar to that of FIG. 6.

Furthermore, by turning on the real load connector switch 26 after confirming that the voltage value V41 of the direct-current voltage V4 generated at the voltage adjustment load 25 is within the defined voltage range, an output voltage VOUT stable not only to the battery whose impedance scarcely varies but also to the real load of large impedance fluctuations (e.g., fluctuations in the power consumption) can be supplied.

Next, a packet signal P2 is generated at the power reception apparatus resonance coil 29 after the output voltage VOUT is supplied to the real load 31 (step S21). The processes from step S21 to step S24 of FIG. 3 are similar to the processes from step S14 to step S17 of FIG. 3. That is, the real load connector switch 26 continues the on state by the voltage and current detector circuit 24, the packet signal P2 is generated at the power reception apparatus resonance coil 29 (step S21), and the power reception controller 22 makes the impedance converter circuit 21 operate on the basis of the voltage value V41 inputted from the voltage and the current detector circuit 24 (step S22). Next, the packet signal P2 is demodulated in the packet signal detector portion 14 of the power transmitter apparatus 1 (step S23), and the value of the voltage value V41 of the direct-current voltage V4 of the voltage adjustment load 31 contained in the packet signal P2 is taken in by the power transmission controller 13 of the power transmitter apparatus 1 (step S24). Further, even if the voltage value VOUT1 of the output voltage VOUT is changed by the impedance fluctuations of the real load 31 (e.g., an increase and a decrease in the power consumption) by periodically repeating the processes from step S21 to step S24 also after the power is supplied to the real load 31, it is possible to maintain the constant voltage value VOUT1 by controlling the switching frequency of the switching circuit 12, and therefore, it is possible to supply an output voltage VOUT, which is stable not only to the battery whose impedance scarcely varies but also to the real load of large impedance fluctuations.

According to the wireless power transmitter apparatus 100 of the above embodiment, it is possible that the influence of the transient responses due to the fluctuations of the input power supply 11 at the startup time of the power transmitter apparatus 1 and sudden state changes at the operation start time of the switching circuit 12 is prevented from being given directly to the real load 31.

In addition, according to the wireless power transmitter apparatus 100 of the present embodiment, the real load connector switch 26 is turned on after confirming that the voltage value V41 of the direct-current voltage V4 generated at the voltage adjustment load 25 is within the defined voltage range. Therefore, the output voltage VOUT, which is stable not only to the battery whose impedance scarcely varies but also to the real load of large impedance fluctuations (e.g., fluctuations in the power consumption), can be supplied.

Further, according to the wireless power transmitter apparatus 100 of the present embodiment, the switching frequency of the switching circuit 12 of the power transmitter apparatus 1 can be controlled. Therefore, it is possible to maintain the constant value of output voltage VOUT even if the value of the output voltage VOUT changes as a consequence of the impedance fluctuations of the real load 31 after the output voltage VOUT starts being supplied to the real load 31 (due to, for example, an increase and a decrease in the power consumption). Therefore, it is possible to supply the output voltage VOUT, which is stable not only to the battery whose impedance scarcely varies but also to the real load 31 of large impedance fluctuations (e.g., fluctuations in the power consumption).

Furthermore, according to the wireless power transmitter apparatus 100 of the present embodiment, impedance matching between the power transmitter apparatus 1 and the power reception apparatus 2 can be achieved without requiring replacing the adjustment load 31 of the power reception apparatus 2, and therefore, it is possible to reduce the cost.

Second Embodiment

Next, the operation of the wireless power transmitter apparatus 100 of the second embodiment of the present disclosure is described with reference to FIG. 4. By comparison to the wireless power transmission process of the wireless power transmitter apparatus 100 of the first embodiment, the wireless power transmission process of the wireless power transmitter apparatus 100 of the second embodiment is characterized in that it is possible to maintain the constant output voltage VOUT even if there are impedance fluctuations of the real load 31 after power is supplied to the real load 31.

Figure 4:
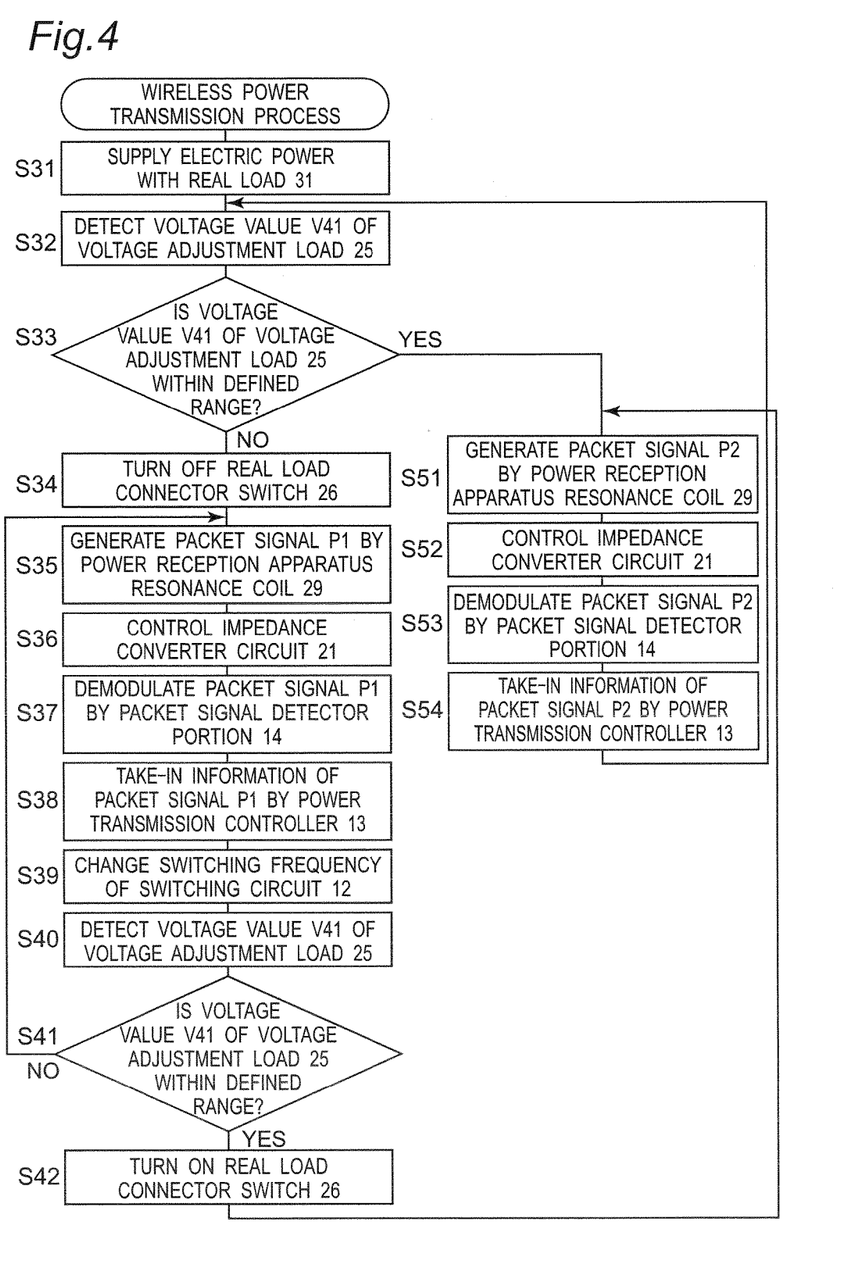
FIG. 4 is a flow chart showing wireless power transmission processing procedures of the wireless power transmitter apparatus 100 of FIG. 1, according to a second embodiment of the present disclosure.

FIG. 4 is a flow chart showing wireless power transmission processing procedures of the wireless power transmitter apparatus 100 of FIG. 1, according to a second embodiment of the present disclosure. The present embodiment is related to the wireless power transmitter apparatus 100 when the value of the output voltage VOUT becomes out of the defined voltage range after the power is supplied to the real load 31.

In the present embodiment, the step S20 of FIG. 3 in which the power is supplied to the real load 31 after the startup of the input power supply 11 corresponds to the step S31 of FIG. 4.

First of all, the voltage value V41 of the direct-current voltage V4 generated at the voltage adjustment load 25 is detected by the voltage and current detector circuit 24 (step S32). In this case, the voltage value V41 of the direct-current voltage V4 generated by the voltage adjustment load 25 becomes the voltage value VOUT1 of the output voltage VOUT via the real load connector switch 26. Therefore, the resistance value of the real load connector switch 26 is very small compared to the impedances of the voltage adjustment load 25 and the real load 31, and the voltage value V41 and the voltage value VOUT1 come to have almost same value. Accordingly, there is no operational problem even if the voltage value V41 is used. Moreover, if the on-resistance value of the real load connector switch 26 is known, the voltage value VOUT1 can be calculated from the voltage value V41. Therefore, when determining whether the voltage value V41 of the direct-current voltage V4 generated at the voltage adjustment load 25 is within the defined voltage range, it is also possible to use the calculated voltage value VOUT1. When the detection result of the voltage value V41 is within the defined voltage range, the processes from step S51 to step S54 are carried out. The processes from step S51 to step S54 in FIG. 4 are similar to the processes from step S21 to step S24 in FIG. 3. By periodically repeating the processes from step S51 to step S54 also after the power is supplied to the real load 31, it is possible to maintain the constant voltage value VOUT1 of the output voltage VOUT by controlling the switching frequency of the switching circuit 12 even if the voltage value VOUT1 is changed by the impedance fluctuations of the real load 31 (e.g., an increase and a decrease in the power consumption), and therefore, it is possible to supply the output voltage VOUT, which is stable not only to the battery but also to the real load 31 whose state fluctuates.

Next, in the case that the voltage value V41 of the voltage adjustment load 25 is out of the defined voltage range (NO in step S33), the real load connector switch 26 is turned off (step S34). As factors that drive the voltage value V41 out of the defined voltage range, abnormal fluctuations in the power of the input power supply 11, sudden fluctuations in the coupled state of the power transmission portion resonance coil 16 and the power reception portion resonance coil 29 and so on can be enumerated. By turning off the load connector switch 26 at this time, no abnormal voltage such as an overvoltage is given to the real load 31, so that the real load 31 can be prevented from being damaged. Moreover, the electric power energy existing in the power reception apparatus 2 at this time can be consumed by the voltage adjustment load 25, so that the power reception apparatus 2 can be prevented from being damaged by the resonance of the electric power energy.

Next, the packet signal P1 is generated by the power reception apparatus resonance coil 29 (step S35). The processes from step S35 to step S39 in FIG. 4 are similar to the processes from step S14 to step S18 in FIG. 3. The switching frequency of the switching circuit 12 is changed in step S39, and consequently the voltage value V41 of the direct-current voltage V4 generated at the voltage adjustment load 25 changes.

Next, the voltage value V41 of the direct-current voltage V4 generated at the voltage adjustment load 25 is detected (step S40). The detected voltage value V41 is transmitted to the power reception controller 24. It is noted that although it is assumed that the voltage and current, or the voltage value V41 is transmitted directly to the voltage and current detector circuit 24 in the present embodiment, it becomes possible to achieve the effect also by, for example, a method for converting the voltage value V41 into digital data or the like by an AD converter or the like provided for, for example, the voltage and current detector circuit 24 and transmitting the present digital data to the voltage and current detector circuit 24 as another method.

Next, if the voltage value V41 of the direct-current voltage V4 generated at the voltage adjustment load 25 is not within the defined voltage range, the real load connector switch 26 continues the off-state by the power reception controller 24, and the packet signal P1 is generated at the power reception apparatus resonance coil 29 (NO in step S41 and step S35). Although the information of the voltage value V41 is contained in the present packet signal P1, it is possible to contain information used for another control besides it. In this case, the processes from step S35 to NO of step S41 will be repeated until the voltage value V41 falls within the defined voltage range.

Next, the processing when the voltage value V41 of the direct-current voltage V4 generated at the voltage adjustment load 25 falls within the defined voltage range (YES in step S41) is described. At this time, when a control signal to turn on the real load connector switch 26 by the power reception controller 22 of the power reception apparatus 2 is outputted to turn on the real load connector switch 26 from off, the direct-current voltage VOUT is supplied to the real load 31 (step S42). At this time, since the voltage value V41 is within the defined voltage range, the output voltage VOUT is supplied as a stable power to the real load 31. Furthermore, since the real load connector switch 26 continues the off-state until the voltage value V41 falls within the defined voltage range, the influence of the transient responses due to the fluctuations of the input power supply 11 at the startup time of the power transmitter apparatus 1 and the sudden state changes at the operation start time of the switching circuit 12 can be prevented from being given directly to the real load.

Furthermore, by turning on the real load connector switch 26 after confirming that the voltage value V41 of the direct-current voltage V4 generated at the voltage adjustment load 25 is within the defined voltage range, the output voltage VOUT stable not only to the battery whose impedance scarcely varies but also to the real load 31 of large impedance fluctuations (e.g., fluctuations in the power consumption) can be supplied.

Next, the packet signal P2 is generated by the power reception apparatus resonance coil 29 after the output voltage VOUT is supplied to the real load 31 (S51). The processes from step S51 to step S54 of FIG. 4 are similar to the processes from step S21 to step S24 of FIG. 1. By periodically repeating the processes from step S51 to step S54 also after the power is supplied to the real load, it is possible to maintain the constant voltage value VOUT1 of the output voltage VOUT by controlling the switching frequency of the switching circuit 12 even if the voltage value VOUT1 of the output voltage VOUT fluctuates due to the impedance fluctuations of the real load (e.g., an increase and a decrease in the power consumption), and therefore, it is possible to supply the voltage stable not only to the battery but also to the real load whose state fluctuates.

According to the wireless power transmitter apparatus 100 of the above embodiment, the voltage outside the defined voltage range can be prevented from being given to the real load even when the voltage value VOUT1 of the output voltage VOUT becomes out of the defined voltage range due to abnormal fluctuations of the power of the input power supply 11, changes in the coupled state of the power transmitter apparatus resonance coil 16 and the power reception apparatus resonance coil 29 or the like.

In addition, according to the wireless power transmitter apparatus 100 of the present embodiment, the real load connector switch 26 is turned on after confirming that the voltage value V41 of the direct-current voltage V4 generated at the voltage adjustment load 25 is within the defined voltage range. Therefore, the output voltage VOUT stable not only to the battery that has almost no impedance fluctuations but also to the real load of large impedance fluctuations (e.g., fluctuations in the power consumption) can be supplied. Furthermore, even if the voltage value VOUT1 of the output voltage VOUT is changed by the impedance fluctuations of the real load (e.g., an increase and a decrease in the power consumption) after the supply of the output voltage VOUT to the real load 31 has started by connection to the real load 31, it is possible to maintain the constant voltage value VOUT1 by controlling the switching frequency of the switching circuit 12, and the output voltage VOUT stable not only to the equipment (e.g., battery) of small impedance fluctuations but also to the equipment (real load 31) of large impedance fluctuations can be supplied.

Further, according to the wireless power transmitter apparatus 100 of the present embodiment, it is possible to control the switching frequency of the switching circuit 12 of the power transmitter apparatus 1. Therefore, it is possible to maintain the constant value of the output voltage VOUT even if the value of the output voltage VOUT changes as a consequence of the impedance fluctuations of the real load 31 (due to, for example, an increase and a decrease in the power consumption) after the supply of the output voltage VOUT to the real load 31 has started. Therefore, it is possible to supply the output voltage VOUT, which is stable not only to the battery of almost no impedance fluctuations but also to the real load 31 of large impedance fluctuations (e.g., fluctuations in the power consumption).

First Modified Embodiment

Figure 7:
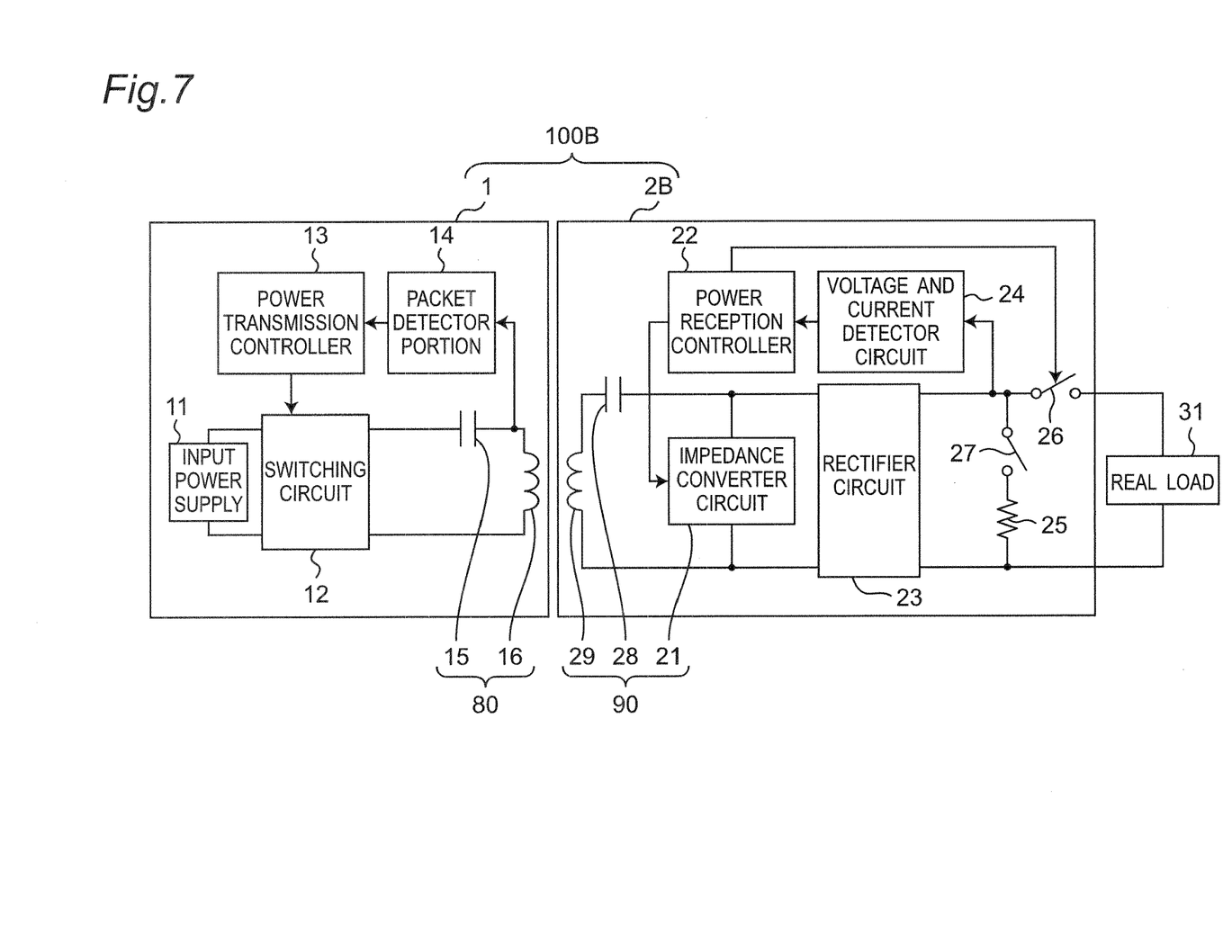
FIG. 7 is a block diagram showing components of a wireless power transmitter apparatus 100B and its peripheral components, according to a modified embodiment of the first embodiment of the present disclosure.

The present disclosure is limited to none of the aforementioned embodiments, and, for example, a wireless power transmitter apparatus 100B as shown in FIG. 7 may be used.

FIG. 7 is a block diagram showing components and peripheral components of the wireless power transmitter apparatus 100B according to a modified embodiment of the first embodiment of the present disclosure. By comparison to the wireless power transmitter apparatus 100 of FIG. 1, the wireless power transmitter apparatus 100B of FIG. 7 is characterized in that a power reception apparatus 2B is provided in place of the power reception apparatus 2. Moreover, the power reception apparatus 2B is characterized in that a voltage adjustment load connector switch 27 to turn on/off connection between the voltage adjustment load 25 and the rectifier circuit 23 is further provided by comparison to the power reception apparatus 2.

According to the wireless power transmitter apparatus 100B of the above modified embodiment, effects similar to those of the aforementioned wireless power transmitter apparatus 100 can be obtained, and the voltage adjustment load connector switch 27 can be turned off after the real load connector switch 26 is turned on. Therefore, it becomes possible to further reduce the power consumption of the voltage adjustment load 25.

Further, although the case where the power reception apparatus 2 and real load 31 are separately constructed has been described in the embodiments and the modified embodiment of the present disclosure, the invention is not limited to this but allowed to be applied to, for example, a construction in which the power reception apparatus 2 and the real load 31 are integrated in a body. Effects similar to those of the embodiments of the present disclosure can be obtained also in this case. Furthermore, the present disclosure can be applied to a variety of electronic equipment (mobile terminals such as mobile phones and tablets, cameras, organic EL displays, illuminations, and the like), which wirelessly transmits electric power.

INDUSTRIAL APPLICABILITY

As described in detail above, according to the power transmitter apparatus, the power reception apparatus and the wireless power transmitter apparatus of the present disclosure, the abnormal voltage due to transient phenomena or the like can be prevented from being given to the load, and it becomes possible to supply the stable voltage to the load.

The invention claimed is:
1. A power reception apparatus configured to receive an alternating-current voltage transmitted wirelessly from a power transmitter apparatus comprising a switching circuit operative to supply a power transmitter apparatus resonance coil with the alternating-current voltage, the power reception apparatus comprising:
a power reception apparatus resonance coil, to which the alternating-current is transmitted from the power transmitter apparatus resonance coil by electromagnetically coupling the power transmitter apparatus resonance coil with the power reception apparatus resonance coil;
a rectifier circuit operative to convert the alternating-current voltage transmitted by the power reception apparatus resonance coil to a direct-current,
a real load supplied with the direct-current voltage from the rectifier circuit;
a voltage adjustment load having an impedance larger than that of the real load and connected in parallel to the rectifier circuit between the rectifier and the real load;
a real load connector switch that switches between a conductive state and a non-conductive state and is configured as an electric connection between the rectifier circuit and the real load;
a detector circuit operative to measure the direct-current voltage applied to the voltage adjustment load; and
a power reception controller that controls the real load connector switch to switch between the conductive state and the non-conductive state, and controls the impedance of the voltage adjustment load,
wherein the power reception controller controls the electric connection between the rectifier circuit and the real load to be in the non-conductive state using the real load connector switch before startup of the power transmitter apparatus,
when the power transmitter apparatus is at started up, the power reception controller maintains the electric connection between the rectifier circuit and the real load to be in the non-conductive state using the real load connector switch and supplies the rectifier circuit with the alternating-current voltage transmitted from the power transmitter apparatus, converts a supplied alternating-current voltage to a direct-current voltage using the rectifier circuit, and supplies the voltage adjustment load with the direct-current voltage, and raises the direct-current voltage by controlling the impedance of the voltage adjustment load until the direct-current voltage applied to the voltage adjustment load measured by the detector circuit reaches within a range of a defined voltage,
when the measured direct-current voltage reaches within the range of the defined voltage, the power reception controller switches the electric connection between the rectifier circuit and the real load from the non-conductive state to the conductive state using the real load connector switch, and supplies the real load with the direct-current voltage, and
when the direct-current voltage applied to the voltage adjustment load reaches within the range of the defined voltage and the power reception controller confirms that the direct current voltage becomes stable within the range of the defined voltage, the power reception controller switches the electric connection between the rectifier circuit and the real load from the non-conductive state to the conductive state using the real load connector switch, and supplies the real load with the direct-current voltage.
2. The power reception apparatus as claimed in claim 1, further comprising a voltage adjustment load connector switch that switches between a non-conductive state and a conductive state and is configured as an electric connection between the voltage adjustment load and the rectifier circuit,
wherein the power reception controller controls the electric connection between the rectifier circuit and the real load to be in the non-conductive state using the real load connector switch before startup of the power transmitter apparatus, and controls the electric connection between the voltage adjustment load and the rectifier circuit using the voltage adjustment load connector switch to be in a non-conductive state, when the power transmitter apparatus is started up, the power reception controller maintains the electric connection between the rectifier circuit and the real load in the non-conductive state using the real load connector switch, and changes the electric connection between the rectifier circuit and the voltage adjustment load from the non-conductive state to the conductive state using voltage adjustment load connector switch, supplies the rectifier circuit with the alternating-current voltage transmitted from the power transmitter apparatus, converts the alternating-current voltage supplied using the rectifier circuit to the direct-current voltage, and supplies the voltage adjustment load with the direct-current voltage, the power reception controller raises the direct-current voltage until the direct-current voltage applied to the voltage adjustment load measured by the detector circuit reaches within a range of a defined voltage, and when the measured direct-current voltage reaches within the defined voltage, the power reception controller switches the electric connection between the rectifier circuit and the real load between the non-conductive state and conductive state using the real load connector switch, and supplies the real load with the direct-current voltage, and switches the electric connection between the voltage adjustment load and the rectifier circuit from the conductive state to the non-conductive state using the voltage adjustment load connector switch.

3. The power reception apparatus as claimed in claim 1, wherein an impedance value of the voltage adjustment load is equal to or larger than a hundred times an impedance value of the real load.

4. A wireless power transmitter apparatus comprising a power transmission apparatus; and a power reception apparatus, wherein the power reception apparatus receives an alternating-current voltage transmitted wirelessly from a power transmitter apparatus comprising a switching circuit operative to supply a power transmitter apparatus resonance coil with the alternating-current voltage, the power reception apparatus comprising:

a power reception apparatus resonance coil, to which the alternating-current is transmitted from the power transmitter apparatus resonance coil by electromagnetically coupling the power transmitter apparatus resonance coil with the power reception apparatus resonance coil;

a rectifier circuit operative to convert the alternating-current voltage transmitted by the power reception apparatus resonance coil to a direct-current, a real load supplied with the direct-current voltage from the rectifier circuit;

a voltage adjustment load having an impedance larger than that of the real load and connected in parallel to the rectifier circuit between the rectifier and the real load;

a real load connector switch that switches between a conductive state and a non-conductive state and is configured as an electric connection between the rectifier circuit and the real load;

a detector circuit operative to measure the direct-current voltage applied to the voltage adjustment load; and a power reception controller that controls the real load connector switch to switch between the conductive state and the non-conductive state, and controls the impedance of the voltage adjustment load, wherein the power reception controller controls the electric connection between the rectifier circuit and the real load to be in the non-conductive state using the real load connector switch before startup of the power transmitter apparatus, when the power transmitter apparatus is at started up, the power reception controller maintains the electric connection between the rectifier circuit and the real load to be in the non-conductive state using the real load connector switch and supplies the rectifier circuit with the alternating-current voltage transmitted from the power transmitter apparatus, converts a supplied alternating-current voltage to a direct-current voltage using the rectifier circuit, and supplies the voltage adjustment load with the direct-current voltage, and raises the direct-current voltage by controlling the impedance of the voltage adjustment load until the direct-current voltage applied to the voltage adjustment load measured by the detector circuit reaches within a range of a defined voltage, when the measured direct-current voltage reaches within the range of the defined voltage, the power reception controller switches the electric connection between the rectifier circuit and the real load from the non-conductive state to the conductive state using the real load connector switch, and supplies the real load with the direct-current voltage, and when the direct-current voltage applied to the voltage adjustment load reaches within the range of the defined voltage and the power reception controller confirms that the direct current voltage becomes stable within the range of the defined voltage, the power reception controller switches the electric connection between the rectifier circuit and the real load from the non-conductive state to the conductive state using the real load connector switch, and supplies the real load with the direct-current voltage.

* * * * *